United States Patent
Johnson (10) Patent No.: US 10,268,776 B1
(45) Date of Patent: Apr. 23, 2019

(54) GRAPH STORE BUILT ON A DISTRIBUTED HASH TABLE

(71) Applicant: Amazon Technologies, Inc., Seattle, WA (US)

(72) Inventor: Albert Cooper Johnson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 15/275,244

(22) Filed: Sep. 23, 2016

(51) Int. Cl.
*G06F 17/30* (2006.01)

(52) U.S. Cl.
CPC .. *G06F 17/30949* (2013.01); *G06F 17/30368* (2013.01); *G06F 17/30958* (2013.01)

(58) Field of Classification Search
CPC ......... G06F 17/30949; G06F 17/30368; G06F 17/30958
See application file for complete search history.

(56) References Cited

U.S. PATENT DOCUMENTS

| | | | | |
|---|---|---|---|---|
| 7,496,051 | B2* | 2/2009 | Wan | H04L 29/06 370/254 |
| 2003/0055892 | A1* | 3/2003 | Huitema | H04L 29/06 709/204 |
| 2003/0154210 | A1* | 8/2003 | Teig | G06F 17/505 |
| 2009/0180489 | A1* | 7/2009 | Fujita | H04L 12/66 370/409 |
| 2013/0336159 | A1* | 12/2013 | Previdi | H04L 45/50 370/254 |
| 2014/0108473 | A1* | 4/2014 | Nowoczynski | G06F 17/30227 707/826 |
| 2014/0379938 | A1* | 12/2014 | Bosch | H04L 47/125 709/242 |

* cited by examiner

*Primary Examiner* — Jorge A Casanova
(74) *Attorney, Agent, or Firm* — Eversheds Sutherland (US) LLP (57) ABSTRACT

Systems and techniques to access and/or configure information in graph store are provided. In some embodiments, a state table can be generated in addition to a main table, such as a distributed hash table embodying the graph store. The state table can include information indicative of a state of a relationship between a first node and a second node in the graph store. Availability of the state table can permit the control of termination of an update in scenarios of inconsistency and/or concurrent updates. As such, updates to a pair of nodes, each having one or more records, can leverage the state table to access the record(s) of the nodes and to modify an edge associated with the node. The state table also can permit controllably terminating an update and/or ensuring that consistency of the graph store is maintained after the update. Approaches to resolve error during updates to the graph store also are provided.

20 Claims, 5 Drawing Sheets

GRAPH STORE BUILT ON A DISTRIBUTED HASH TABLE

BACKGROUND

A graph store can typically permit retaining and organizing a substantive amount of information as a directed graph having nodes and edges, each of the nodes including some desired content and each of the edges associated with a pair of nodes including some other content, such as an attribute, that can characterize a relationship between the pair of nodes. A graph store that can be updated by many actors can present multiple issues, including record locks, inconsistency, unterminated record updates (or record changes), and the like. In addition, graph stores including nodes having a large number of records can halt an update due to inefficiencies in accessing one or more of such nodes. Therefore, much remains to be improved in the configuration of information in a graph store.

BRIEF DESCRIPTION OF THE DRAWINGS

The accompanying drawings are an integral part of the disclosure and are incorporated into the subject specification. The drawings present example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, in at least some embodiments, the issue of accessing and/or configuring information in a graph database (which also can be referred to as a graph store). Accordingly, the disclosure provides embodiments of systems, devices, and techniques to update and/or read one or more records and relationships associated therewith in a graph store having nodes and edges constituting a directed acyclic graph, for example, where each node embodies an information object (e.g., a permission object) and each edge can be named for an attribute of the information that the edge represents (e.g., the edge can be named for a permission the edge represents). Records also can be indicative or otherwise representative of a node identifier (ID) of a node that an edge points to. In addition or in some implementations, the graph store also can retain the inverse of an edge. Specifically, in one example, for an edge from a first node in the graph store to a second node in the graph store, the inverse edge from the second node to the first node exists. Thus, in some aspects, irrespective of the edge direction (or relationship side) between nodes in which the graph store is queried, an outcome of a query is consistent. In some embodiments, the graph store is based on a distributed hash table, wherein a node can be within multiple records under a same hash key. In one aspect, the hash key embodies the node ID and a range key associated with the node embodies an increasing index or counter indicative of a record within the node. In addition or in some instances, the range key also can specify a value (e.g., a defined permission) of an edge. Therefore, in one aspect, a record in a node represents at most a single value (e.g., a single permission) despite the node having multiple records, for example. In addition, an attribute is the name of an edge, and the attribute can contain all of the nodes that the edge points to. In some implementations, in scenarios in which a node exceeds a defined threshold size for storage in a single record, a new range key can be created and the excess data can be stored there in accordance with aspects described herein. Further or in some embodiments, a state table is included to track a current state of a relationship and/or any changes to the relationship (or, in some instances, the database) that may be occurring. In some implementations, the state table also can have a hash key embodied in or including a triple (or 3-tuple) including first information indicative of a start node, second information indicative of an end node, and third information indicative of an information attribute (e.g., a permission). Furthermore or in other embodiments, a log table, a log file, or any other type of storage element that permits retaining log information can be included in addition to the graph store and the state table. In an embodiment in which a log table is included, the log table can utilize or otherwise leverage the same hash key as the state table, and the log table also can have a record for each version of the relationship (or, in some instances, a version of an edge) along with a state of the relationship, and versioning information indicative of when a version of the relationship was created. In one aspect, the information can permit or otherwise facilitate retaining a copy of any changes that are occurring in the graph store. Thus, in an instance in which the state table becomes unavailable, the log information (e.g., a log table or a log file) can permit or otherwise facilitate recovering the state table.

Implementation or adoption of the architectures and/or techniques in accordance with at least some embodiments of this disclosure can improve computational efficiency of a computing system that utilizes or otherwise leverages information retained in a graph database in accordance with aspects of this disclosure. More specifically, in one example, embodiments of the disclosure permit or otherwise facilitate the generation of nodes having a number of edges in the order of 1,000,000. Such nodes can be referred to as super nodes, and in some instances, a super node can have less than a million edges (e.g., a number of edges of the order of thousand edges or another number of edges of the order of tens of thousands of edges) or more than a million edges. Super nodes can be updated, for example, when an advertiser in an advertisement system is generated: a first super node to grant access (or permission) to create segments; a second super node to grant access to create pixels or creatives; a third super node that constitutes a segment administration group as it owns all segment group; and a fourth super node that constitutes a segment permission group of the advertiser. As such, regardless the specific characteristics of a super node, services (e.g., software applications) having multiple designs for information objects (e.g., permission objects) utilized by the service can need or can leverage super nodes or other types of large nodes to exist. In another example, embodiments of the disclosure permit or otherwise facilitate querying a node for a specific set of one or more edges. Such a querying can permit or otherwise facilitate less data to be read when making traversals across large nodes, such as group nodes where the relationship between members is large. In another example, embodiments of the disclosure can ensure consistency, ensuring that when an edge exists, the inverse edge also exists. The same applies when the edge does not exist. Such consistency ensures that when a relationship is read from either direction (e.g., from a start node in a graph store to an end node in the graph store or from the end node to the start node), the relationship returns the same result. In yet another example, embodiments of the disclosure do not lock on anything coarser than the total relationship between two nodes in the graph store. In some implementations, rarely are multiple edges being added or removed between two nodes at the same time, so a lock on the multiple edges is unlikely to cause contention. In addition or in other embodiments, a lock free implementation is provided because most calls do not conflict and they can be implemented (e.g., executed) together. Accordingly, in one aspect, only calls to both add and remove the same edge at the same time should conflict. Thus, embodiments of the disclosure can mitigate malicious attacks leveraging such a conflict. To that point, in some aspects, embodiments of the disclosure can provide an ordering of the updates (or changes) being made that can conflict. Thus, in one aspect, recovery of data can be simplified because, at a minimum, it would be possible to replay the changes in order and get back to the end state. Such an ordering can be retained in log information, which as described herein, can be retained in a log table, a log file, or any type of storage element. In still another example, embodiments of the disclosure can keep both read and write costs substantially lower than in conventional systems. Specifically, in one example, reading a node can cost one read unit—on average—and inserting an edge can cost about 18 writes.

Figure 1:
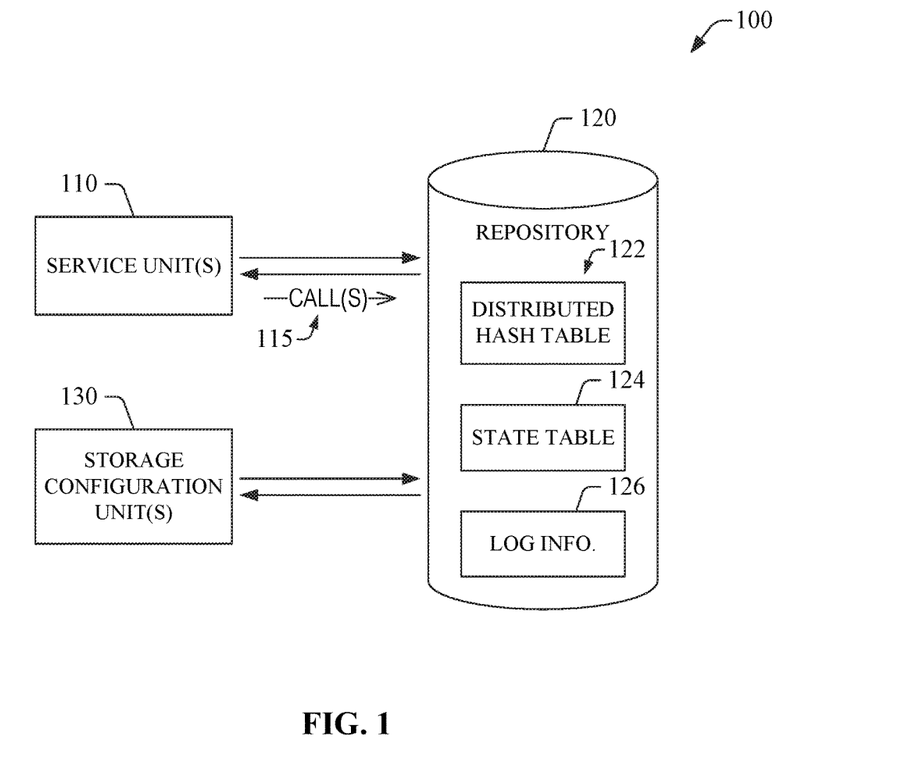
FIG. 1 presents an example of a computing environment to access and configure storage of information in a graph store in accordance with one or more aspects of the disclosure.

Referring to the drawings, FIG. 1 illustrates an example of a computing environment 100 that can permit searching of logging information in accordance with one or more embodiments of the disclosure. The computing environment 100 can include one or more service units 110, which can embody or can constitute host computers that execute a software application to provide a service. In some implementations, the software application and the execution thereof can be provided as software-as-a-service, in which the software application can be executed by multiple virtual machines implemented within host computers in a distributed configuration, such as a massively parallel execution configuration. The service can be embodied in or can include a permissions service, the hosting of a website, a ticketing service, a billing service, a social media service, or the like. Such a website can be embodied in or can include, for example, an advertiser website, a merchant website, a non-profit organization website, a for-profit organization website, a government entity website, or the like.

At least one (or, in some embodiments, each) of the service unit(s) 110 can access a repository 120. To that end, in some aspects, a service unit of the service unit(s) 110 can query the repository 120 and/or can implement other types of function calls to update (e.g., modify and/or create) information retained in the repository 120. The number and/or types of function calls can be specific to the service provided by the service unit(s) 110. Regardless of the specific type of function calls, the service unit of the service unit(s) 110 can direct or otherwise cause the repository 120 to store information and/or update other information in accordance with aspects described herein. One or more of the function calls are represented as call(s) 115. In addition, at least one (or, in some embodiments, each) of the service unit(s) 110 can be functionally coupled (e.g., communicatively coupled) with the repository 120 via a communication network, including communication link(s), represented in FIG. 1 with two arrows oriented in opposite directions. Such a communication network can include wired link(s) and/or wireless link(s), and several network elements (such as routers or switches, concentrators, servers, and the like) that form a personal area network (PAN), a local area network (LAN), a metropolitan area network (MAN), a wide area network (WAN), and/or other networks (wireless or wired) having different footprints.

The repository 120 can be embodied in or can include, for instance, a distributed storage system (not depicted) including memory storage devices. The memory storage devices can be configured in a distributed architecture and can be accessed as a service. Thus, in one aspect, such devices may be referred to as storage service devices. More specifically, as described herein, the repository 120 can include a graph store, or a graph database built on a distributed hash table 122. The graph store can be indexed in accordance with aspects described herein, which can permit reading a node and associated edges. The repository 120 also can include a state table 124. In addition, the repository 120 can include one or more storage service devices that can retain log information 126. As mentioned, the log information 126 can be retained as a table, a file, or any type of logical structure. In some aspects, ordering information indicative or representative of an ordering of a series of updates (or changes) made or being made to the distributed hash table 122 can be retained in the log information 126. As further mentioned, such ordering information can permit or otherwise facilitate to replay the changes in an order in which the changes were implanted. In addition or in other aspects, information indicative of first changes that occurred before second changes and/or other information indicative of third changes that occurred after the second changes can permit replaying (or re-implementing) in parallel those changes that do not have a respective relationship and replaying serially other changes that do have respective relationships. Accordingly, in some instances, recovery of an overall state of the distributed hash table can be achieved efficiently. At least one of the storage configuration units(s) 130 can implement or otherwise execute such a recovery.

As illustrated, the computing environment 100 also includes one or more storage configuration units 130 that can implement a function call from a service unit from the service unit(s) 110. Thus, in some implementations, at least a subset of the storage configuration unit(s) 130 can embody or can constitute a transaction library. At least one (or, in some embodiments, each) of the storage configuration unit(s) 130 can be embodied in or can include a host computer that can implement or otherwise execute a function call to update information retained in the distributed hash table 122 in accordance with embodiments of the disclosure. Such a function call can be embodied in or can constitute the one or more calls 115. In addition, at least one (or, in some embodiments, each) of the storage configuration unit(s) 130 can be functionally coupled (e.g., communicatively coupled) with the repository 120 via a communication network, including communication link(s), represented in FIG. 1 with two arrows oriented in opposite directions. Similar to other networks described herein, such a communication network can include wired link(s) and/or wireless link(s), and several network elements (such as routers or switches, concentrators, servers, and the like) that form a PAN, a LAN, a MAN, a WAN, and/or other networks (wireless or wired) having different footprints. The communication network that permits or otherwise facilitates the exchange of information between the storage configuration unit(s) 130 and the repository 120 can be the same or a different network that permits or otherwise facilitates the exchange of information between the service unit(s) 110 and the repository 120.

In response to or in the implementation of a function call (e.g., one of the call(s) 115) to update a single pair of records (e.g., insert an edge in the distributed hash table 122 or remove another edge from the distributed hash table 122) one or more of the storage configuration unit(s) 130 can implement numerous functions that, in some implementations, can be grouped in stages. More specifically, in one example, the stages can include the following: Stage I. Read the state table 124 for an edge associated with a start node and an end node in order to get the current version and current state. If the current state is the same as the new end state requested by the function call, then return that the update is complete. If not, continue to Stage II. In Stage II, execute or otherwise implement a conditional update on the state table 124. Such an update is conditioned on the current state being the state that was read in Stage I. In response to such a condition being satisfied, the update can change the current state to indicate a transition is in progress from state "current" to "current+1," and the new state can be the requested change. As such, the update effectively places a hold that can cause other writer components (e.g., other one or more of the storage configuration unit(s) 130) to determine that a change to the distributed hash table is being attempted. As such, if a unit of storage configuration components that implements the function call determines that a transaction is in progress for the opposite change, the call is failed. Therefore, the one or more of the storage configuration unit(s) 130 that implement the function call can abandon the update or can claim the update and continue to Stage III. In Stage III, execute or otherwise implement a conditional update on the start node by inserting that there is a change being made between the start node and the end node. Such an update is based on the condition that the record associated with the start node has the same state as the current state. If the conditional update fails because the change requested by the function call has already been made, then continue, or otherwise fail the change. Stage IV. Execute or otherwise implement a conditional update on the end node by inserting that there is a change being made between it and the start node, and removing the start node if the call is to remove the edge. Such an update is based on the condition that the record of the edge has the same state as the current state. If the conditional update fails because the change has already been made, then continue, or else fail the change requested by the function call. Therefore, in some aspects, Stage III and Stage IV update the relationship between the start node and the end node according to the information in the state table 124. Stage V. Execute or otherwise implement a conditional update on the state table 124 to indicate the change (or update) requested by the function call is committed. Such an update is conditioned on whether the record associated with the edge, in the state table 124, is indicative or otherwise representative of a change is in progress. If the update has already been completed, then continue, or else fail the function call. Stage VI. Add a record to the log information 126 (e.g., a log table or a log file) that the change (or update) requested by the function call completed. Stage VII. Execute or otherwise implement a conditional update on the start node to remove the change value and set the new state—inserting the end node in the distributed hash table 122 if the change requested by the function call is to insert an edge, or removing the end node from the distributed hash table 122 if the change requested by the function call is to remove the edge. Such an update is conditioned on whether the change value exists. If the change value does not exist, then verify that the state value in the state table 124 is in the new state and continue, or otherwise fail the change requested by the function call. Stage VIII. Execute or implement a conditional update on the end node to remove the change value and set the new state—inserting the start node in the distributed hash table 122 if the change requested by the function call is to insert an edge, or removing the start node from the distributed hash table 122 if the change requested by the function call is to remove the edge. Such an update is conditioned on whether the change value exists. If the change value does not exist, then verify that the state value in the state table 124 is in the new state and continue, or otherwise fail the change. Accordingly, in some aspects, Stage VII and Stage VIII constitute clean-up stages of Stage III and Stage IV, implementing respective updates to the start node and the end node in order to reflect the change (or update) implemented in response to the function call. Stage IX. Execute or implement a conditional update on the state table 124 that the current version is the new value, the state is the new value, and remove references to the function call. Such an update is conditioned on whether the change (or update) requested by the function call is in the committed state, and thus, can indicate that the requested change is complete. If the change has already been made, then return an indication of success, or otherwise return another indication of fail or error. In some embodiments, the indication of success and the other indication of fail or error can include respective messages or another type of respective information structures sent to at least one of the service unit(s) 110 according to a defined communication protocol. In at least one of such embodiments, an interface or another type of communication link coupling at least one of the storage configuration unit(s) 130 and at least one of the service unit(s) 110 can permit or otherwise facilitate the transmission of the respective messages or the other type of respective information structures.

In scenarios in which there is an error performing the change (or update) requested by a function call (e.g., one of the call(s) 115), one or more of the storage configuration units 130 can check the state table 124 to identify a root cause and/or perform a root-cause analysis. In addition, or in other scenarios, if another change is being made, a function call to update a pair of records can fail and the data in the distributed hash table 122 can be left unchanged. Thus, the storage configuration unit (e.g., a host computer) of the storage configuration unit(s) 130 that is performing changes in response to the function call can complete the work being performed.

In addition or in some embodiments, at least one of the storage configuration unit(s) 130 can implement the foregoing update in scenarios in which two node records in the distributed hash table 122 are updated. As mentioned, in some embodiments of the distributed hash table 122, a range key associated with a node having multiple records embodies an increasing index or counter indicative of a record within the node. In addition, the state table 124 can include state information indicative of the range key that an edge is located. Similarly stated, the state information can be indicative of a record under which information of an edge is stored in the distributed hash table 122, both from a start node and an end node. In scenarios in which a node spreads across multiple records, at least one of the storage configuration unit(s) 130 can deterministically discover which records to update. In such a scenario, the at least one of the storage configuration unit(s) 130 can modify the functions in Stage I for the update of a single pair of records. Specifically, the at least one storage configuration unit can implement the following: Stage A. Read the state table 124 to get the current version and the current state of an edge. If the current state is the same as the new end state, return that the update is complete. If not, then continue to Stage B. In Stage B, if there is state information, the state information can contain, as discussed, the range keys for the start node and the end node, so the records that need to be updated can be found. Transition to Stage II in the update logic, or otherwise continue. Stage C. If there is no state information, read the first record for the node. Stage D. If the first node includes information indicative or otherwise representative of more than one record being included in the node, use the pointer to the last record to read the last record for the node, this last record will be used to store the data. If there is no last record pointer use the first record to store the data. Stage E. Determine or otherwise calculate the size of the record to store the data. If it is above a threshold size permissible for a record size, increment the last pointer in the first record and save it. In some implementations, the threshold size can correspond to a defined a percentage of a total size allowed to be retained in the distributed hash table 122. Stage F. Create a state record that indicates the location in the chain that stores the data and the update being made. Continue to Stage III in the foregoing update functions.

In some implementations, a storage configuration unit of the storage configuration unit(s) 130 and/or a service unit of the service unit(s) 110 can read a node as follows. The storage configuration unit or the service unit can run a query, e.g., execute or otherwise implement a query call, to get all records for a hash key of the node, reading the edges that are applicable or otherwise needed. In addition, when reading the respective values for each of the edges, if a value of an edge is determined to be indicative or otherwise representative of a change in progress, all other records for the node can be ignored. Instead, the storage configuration unit or the service unit can read or otherwise access the state table 124 to obtain a current value of the edge. If the current value in the state table 124 is indicative or otherwise representative of a change-in-progress or failed, then the old value is utilized. In the alternative, if the change is committed, the new value. Such an implementation allows, in one aspect, for the state of the distributed hash table 122 to be consistent.

Examples of values read or otherwise accessed by a storage configuration unit of the storage configuration unit(s) 130 and/or a service unit of the service unit(s) 110 during the foregoing update stages include the following: Stage I, start node: reads old value; end node: reads old value. Stage II, start node: reads old value; end node: reads old value. Stage III, start node: reads change in progress, so state is read from state table 124. Change in progress is conveyed by state table, so old value is utilized. End node: reads old value. Stage IV, start node: reads change in progress, so state in state table is read. Change in progress is conveyed by the state table 124, so old value is utilized. End node: reads change in progress, so state is read from state table. Change in progress is conveyed by the state table 124, so old value is utilized. Stage V, start node: reads change in progress, so state is read from the state table 124. Change is in committed state according to the state table, so new value is utilized. End node: reads change in progress, so state is read from state table 124. Change is in committed according to the state table, so uses new value. Stage VI, start node: reads change in progress, so state is read from the state table 124. Change is in committed according to the state table, so new value is utilized. End node: reads change in progress, so state is read from the state table 124. Change is in committed according to the state table 124, so new value is utilized. Stage VII, start node: reads new value; end node: reads change in progress, so state is read from the state table 124. Change is in committed according to the state table 124, so new value is utilized. Stage VIII, start node: reads new value; end node: reads new value. Stage IX, start node: reads new value; end node: reads new value.

In some embodiments, a function call (e.g., one of call(s) 115) from a service unit of the service unit(s) 110 can permit or otherwise support making multiple updates to the graph store embodied in or including the distributed hash table 122. For instance, register calls can allow multiple owners, and grant calls can allow multiple permissions. In some implementations, it can be desirable to determine in advance that an update to the distributed hash table 122 can fail because, in one aspect, it also would be desirable that all updates associated with such a function call fail as well. Such a collective failure can reduce the likelihood that the distributed hash table 122 can become inconsistent and, thus, can cause unexpected results for queries. To achieve such a behavior, in one aspect all updates within the same call can first verify that there is not a conflicting update being attempted at the same time before continuing. In addition or in some implementations, if there are multiple updates in a call they can wait for all of the updates to confirm this before initiating Stage III in the update implementation described herein. This allows for the call to fail before making changes to the data when one of the updates would have failed because of a conflicting update.

In addition or in other embodiments, rather than performing a change to a single edge, a change can be coordinated or otherwise implemented across a number of edges concurrently. In some instances, a call of the call(s) 115 can result in the insertion of ten edges at once, for example, and from the perspective of the caller device, it is desired or intended that the call ensures that all ten insertions succeeded or all ten insertions failed. A scenario in which five insertions succeed and five insertions fail can be undesirable or otherwise unacceptable. To that end, in some implementations, Stage I described herein can be modified to contemplate performing multiple changes on multiple edges. As such, the implementation can be performed in parallel, checking to determine if any individual edge needs to be changed and which changes are already completed. In aspect, a proposed change on the edges can be marked or otherwise characterized to indicate that, in the future, an edge is to be either inserted or removed in each step. After or upon the marking, a storage configuration unit, for example, can wait until all steps have returned indicating either success in putting the edge in the proposed state or failure (and, in some implementations, the reason for the failure. In response to failure, the storage configuration unit can either fail back to the caller device (or, in some embodiments, a caller thread implemented by the caller device) with the change that failed or can continue the update.

In addition to reading individual records to determine if the update can move forward or not, if the storage configuration unit (or, in some embodiments, a worker process) determines that an edge is in the proposed state, the edge can be assigned a defined period of time (a "time out," for example) on how long the original requester has to transition the edge out of the proposed state. As such, if the storage configuration unit determines that an edge is in the proposed state, the storage configuration unit can wait for the defined period of time to elapse before checking again to determine if the edge has been transitioned out of the proposed state. If the edge remains in the proposed state after the defined period of time has elapsed, the storage configuration unit 130 can assign a new version to the edge in order to claim the edge. Thus, if a previous proposed attempts to make any change, the change will not succeed and then the previous proposer device (e.g., one of storage configuration unit(s) 130) may have to review it later. In response to all the threads have marked the state of the edge as proposed, a batch record can be generated and retained in a table (which may be referred to as a batch table) including information indicative of representative of the old collection of changes that are going to run. In one embodiment, the batch table (not depicted) can be retained in one or more memory elements of the repository 120. Therefore, a number of other threads can be initiated, each of the threads being associated with a respective record in the batch table. A thread of such threads transitions an edge out of the proposed state into an in-progress state, which then causes Stage II through Stage IX to be triggered.

In some aspects, if in trying to transition an edge from a proposed state to an in-progress state, a thread determines that the version of the edge has been changed, then the threat does not attempt to make any changes to the edge. In addition, the thread logs the update to the edge as completed successful because, effectively, the graph store being updated is going to be consistent regardless of not all update stages being complete.

Various approaches to resolve errors during updates to the graph store also can be implemented. For instance, in some scenarios, an update can be left in an unterminated or otherwise incomplete state—one or more of the storage configuration unit(s) 130 can fail to complete a transaction, which failure can be represented as committing an update (or change), and then failing to delete an edge, for example, because the commit itself was not implemented or otherwise executed. To resolve such an issue, a storage configuration unit of the storage configuration unit(s) 130 can check the state table 124 for records indicative or otherwise representative of an update being in progress, but which update has not been worked on within a defined period of time. To that end, in some aspects, the storage configuration unit can follow the update stages described herein until it is completed. In some implementations, the storage configuration unit can implement (e.g., execute) a process, such as a daemon, to perform the foregoing functionality. In other scenarios, a repository management unit associated with the repository 120 can retry continuously or semi-continuously to implement an update left in an incomplete state.

Figure 2:
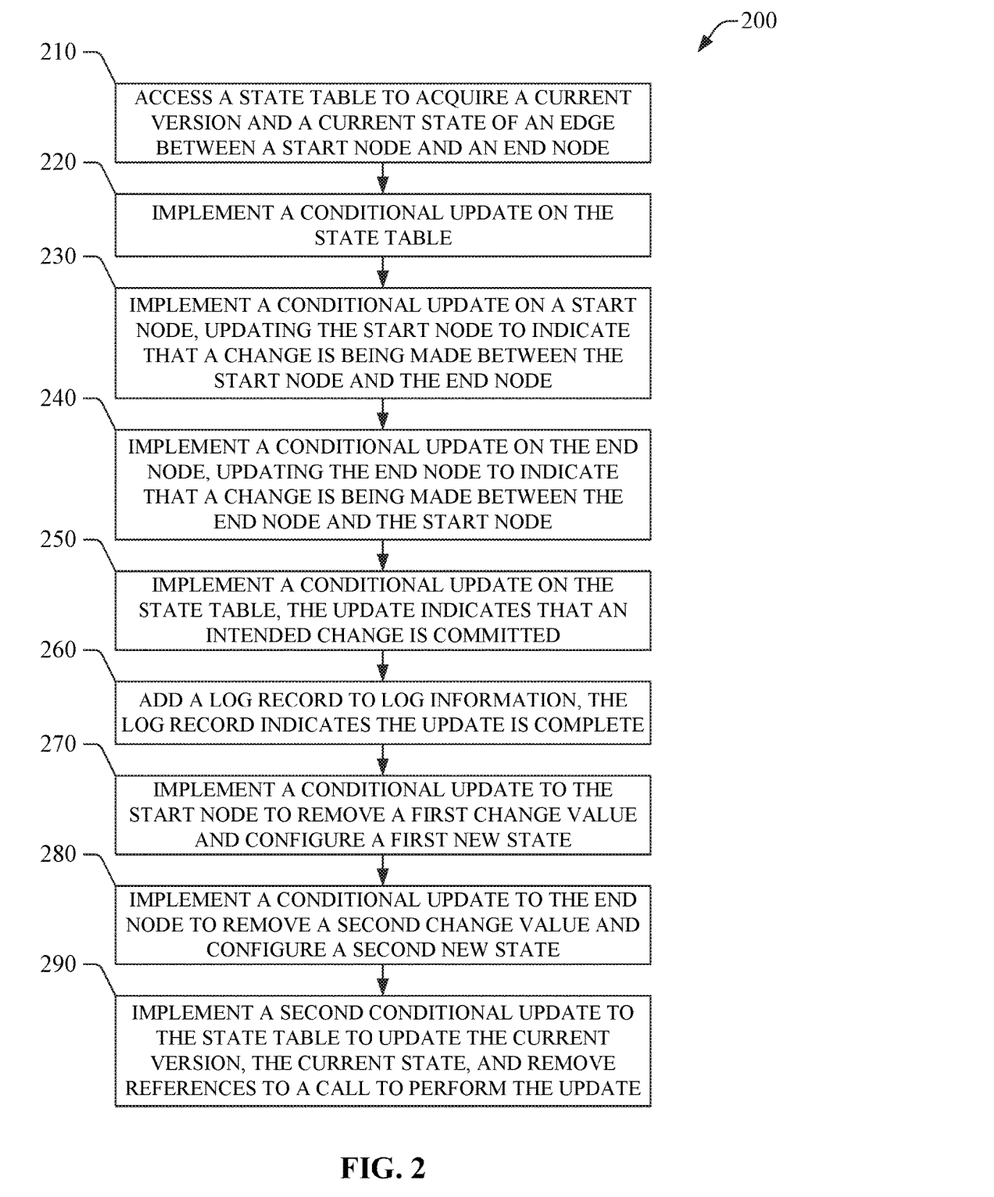
FIG. 2 presents an example of a method for updating a single pair of records in a graph store in accordance with one or more embodiments of the disclosure.
Figure 3:
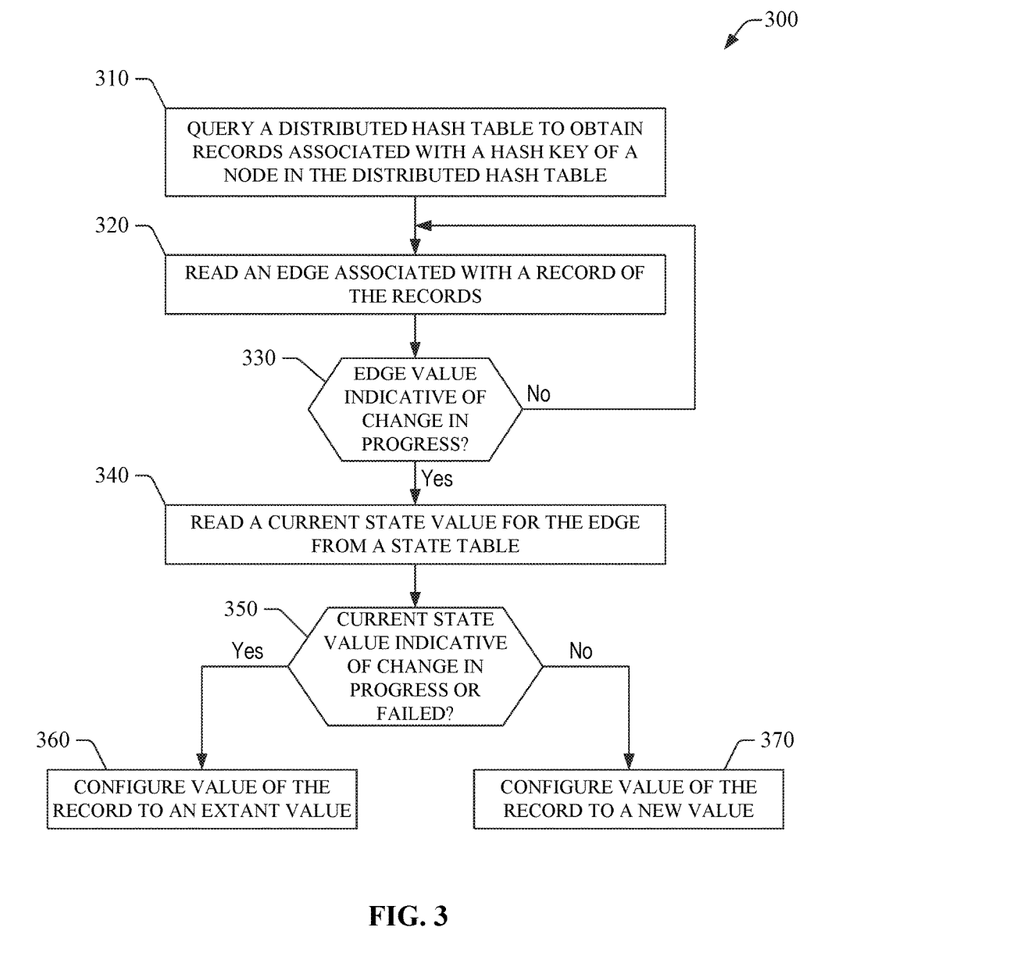
FIG. 3 presents an example of a method for reading a node of a graph store in accordance with one or more embodiments of the disclosure.
Figure 4:
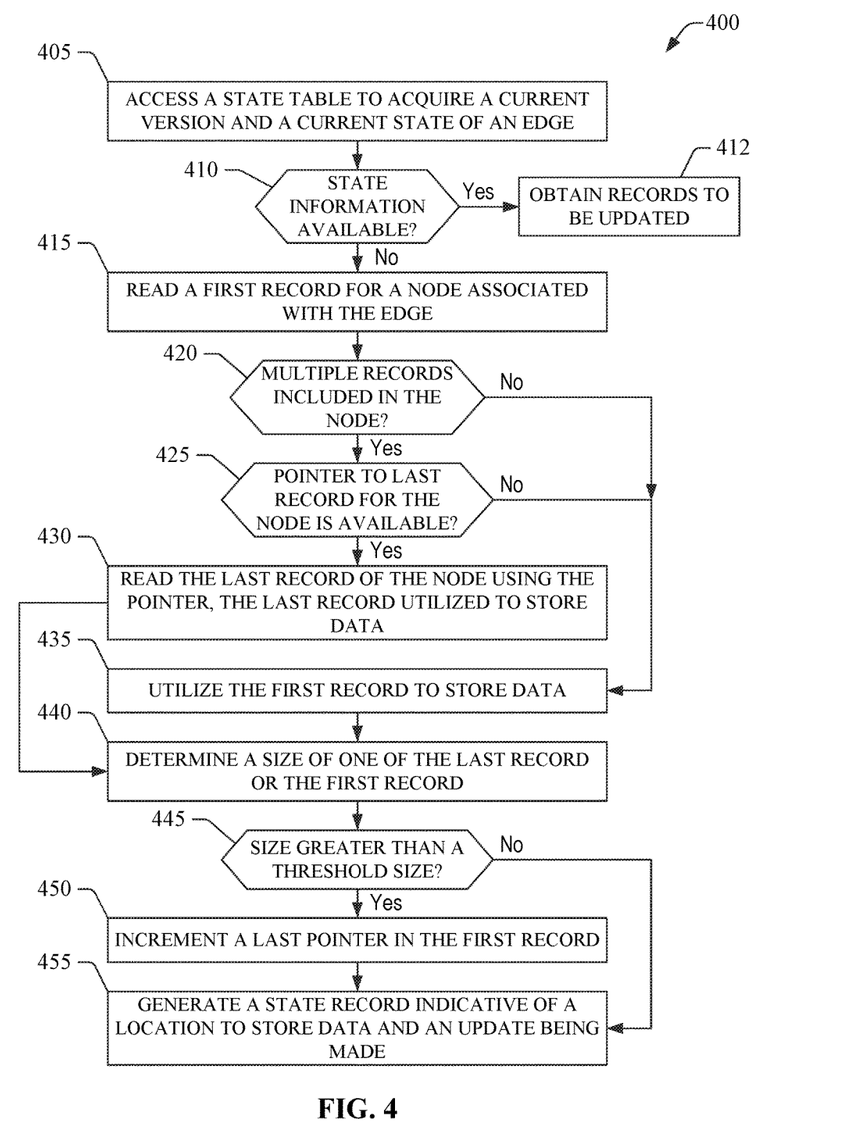
FIG. 4 presents an example of a method for handling a node that includes more than one record in accordance with one or more embodiments of the disclosure.

In view of the aspects of the disclosure described herein, example methods that can be implemented in accordance with the disclosure can be more readily appreciated with reference to the flowcharts in FIGS. 2-4. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

It is noted that the methods of the disclosure can be retained on an article of manufacture, or computer-readable medium, to permit or facilitate transporting and transferring such methods to a computing device (e.g., a desktop computer; a mobile computer, such as a tablet, or a smartphone; a mobile telephone; a blade computer; a programmable logic controller, and the like) for execution, and thus implementation, by a processor of the computing device or for storage in a memory device thereof or functionally coupled thereto. In one aspect, one or more processors, such as processor(s) that implement (e.g., link, compile, and/or execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 2 illustrates a flowchart of an example method 200 for updating a single pair of records in a graph store according to one or more embodiments of the disclosure. In some embodiments, updating the single pair of records can include, for example, inserting an edge from a distributed hash table or removing an edge from the distributed hash table. In some embodiments, a computing system that has at least one processor and/or is functionally coupled to at least one processor can implement (e.g., link, compile, and/or execute) one or more blocks of the example method 200. In some scenarios, one or more blocks of the example method 200 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 200 being implemented by a distributed or non-distributed computing system, the at least one processor can be functionally coupled to at least one memory device or other types of computer-readable non-transitory storage media. In some embodiments, the computing system can be embodied in or can include at least one of service unit(s) 110, at least one of the storage configuration unit(s) 130, and/or the repository 120.

At block 210, the computing system that implements the example method 200 can access a state table to acquire a current version and a current state of an edge between a start node and an end node. At block 220, the computing system can implement a conditional update on the state table. At block 230, the computing system can implement a conditional update on a start node, updating the start node to indicate that a change is being made between the start node and the end node. At block 240, the computing system can implement a conditional update on the end node, updating the end node to indicate that a change is being made between the end node and the start node. At block 250, the computing system can implement a conditional update on the state table, where the update can indicate that an intended change is committed. At block 260, the computing system can add a log record to log information, where the log record can indicate that the update is complete. At block 270, the computing system can implement a conditional update to the start node to remove a first change value of a record associated with the start node, and to configure a first new state. At block 280, the computing system can implement a conditional update to the end node to remove a second change value of a record associated with the end node, and to configure a second new state. At block 290, the computing system can implement a second conditional update to the state table to update the current version of the edge, the current state of the edge, to remove references to a call to perform the update.

FIG. 3 illustrates a flowchart of an example method 300 for reading a node according to one or more embodiments of the disclosure. In some embodiments, a computing system that has at least one processor and/or is functionally coupled to at least one processor can implement (e.g., compile, execute, compile and execute, etc.) one or more blocks of the example method 300. In some scenarios, one or more blocks of the example method 300 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 300 being implemented by a distributed computing system or a non-distributed computing system, the at least one processor can be functionally coupled to at least one memory device or other types of computer-readable non-transitory storage media. In some embodiments, the computing system can be embodied in or can include at least one of service unit(s) 110, at least one of the storage configuration unit(s) 130, and/or the repository 120.

At block 310, the computing system that implements the example method 300 can query a distributed hash table to obtain records associated with a hash key of a node in the distributed hash table. At block 320, the computing system can read or otherwise access an edge (or, in some implementations, information indicative or otherwise representative of the edge) associated with a record of the records. At block 330, the computing system can determine if an edge value is indicative of change in progress. In response to a negative determination, the computing system can redirect the flow of the example method 300 to block 320 in order to read another edge associated with another record of the records. In the alternative, in response to an affirmative determination at block 330, the computing system can read a current state value for the edge from a state table (e.g., state table 124) at block 340. At block 350, the computing system can determine if the current state value is indicative of a change-in-progress state or a failed state. In response to a positive determination, at block 360, the computing system can configure a value of the record to an extant value (which also may be referred to as an old value). In the alternative, in response to a negative determination (e.g., the current state is indicative of a committed state), the computing system can configure a value of the record to a new value at block 370.

FIG. 4 illustrates a flowchart of an example method 400 for handling a node that includes more than one record according to one or more embodiments of the disclosure. In some embodiments, a computing system that has at least one processor and/or is functionally coupled to at least one processor can implement (e.g., compile, execute, compile and execute, etc.) one or more blocks of the example method 400. In some scenarios, one or more blocks of the example method 400 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 400 being implemented by a distributed or non-distributed computing system, the at least one processor can be functionally coupled to at least one memory device or other types of computer-readable non-transitory storage media. In some embodiments, the computing system can be embodied in or can include at least one of service unit(s) 110, at least one of the storage configuration unit(s) 130, and/or the repository 120.

At block 405, the computing system that implements the example method 400 can access a state table to acquire a current version and a current state of an edge. At block 410, the computing system can determine if state information is available. In response to a positive determination, at block 412, the computing system can obtain records to be updated. To that end, in one aspect, the state information can include range keys respectively associated with such records. In the alternative, in response to a negative determination, at block 415, the computing system can read a first record for a node associated with the edge. At block 420, the computing system can determine if multiple records are included in the node. In response to a positive determination, at block 425, the computing system can determine if a pointer to a last record of the multiple records for the node is available. In response to an affirmative determination, at block 430, the computing system can read the last record of the node using at least the pointer, where the last record can be utilized to store data. In the alternative, in response to a negative determination in block 425, the computing system can utilize the first record to store data at block 435. At block 440, the computing system can determine a size of one of the last record in the node (in an embodiment in which the node has multiple records) or the first record in the node. Regardless of the specific record for which the size is determined or otherwise calculated, at block 445, the computing system can determine if the size is greater than a threshold size, such as a maximum size permissible for a record within a node in a hash table. In response to a negative determination, flow can continue to block 455. In response to an affirmative determination, at block 450, the computing system can increment a last pointer in the first record. In addition or in some implementations, the computing system also can save the last pointer. At block 455, the computing system can generate a state record indicative of a location to store data and an update being made.

Figure 5:
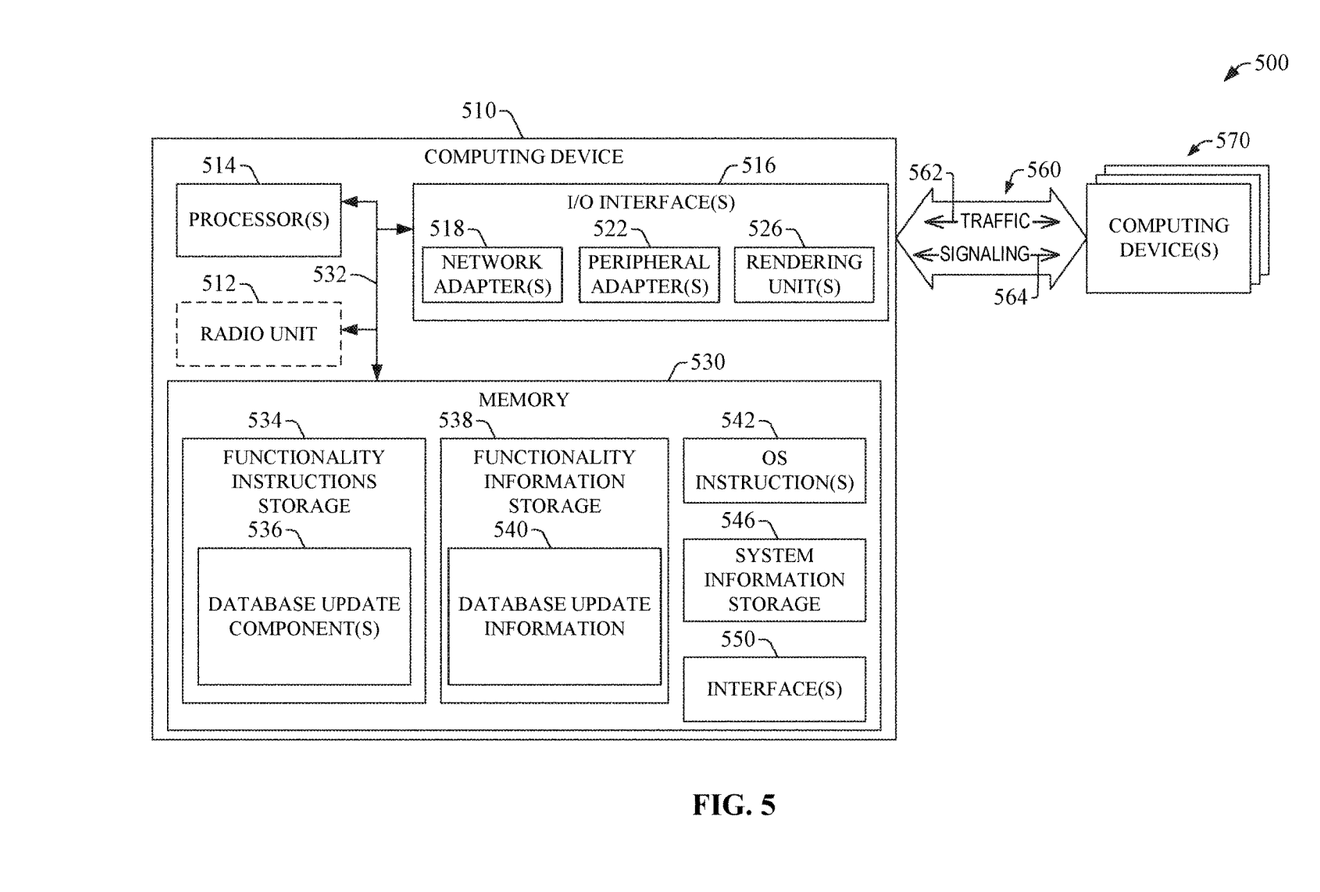
FIG. 5 presents an example of a computational environment for access and/or configuration of information in a graph store in accordance with one or more embodiments of the disclosure.

FIG. 5 illustrates a block diagram of an example computational environment 500 for for access and/or configuration of information in a graph store in accordance with one or more aspects of the disclosure. The example computational environment 500 is merely illustrative and is not intended to suggest or otherwise convey any limitation as to the scope of use or functionality of the computational environment's architecture. In addition, the illustrative computational environment 500 depicted in FIG. 5 should not be interpreted as having any dependency or requirement relating to any one or combination of components illustrated in the example operational environments of the disclosure. The example computational environment 500 or portions thereof can embody or can include, for example, the computing environment 100. For example, one or more of the computing devices, and elements thereof, in the example computational environment 500 can embody or can constitute devices (or, in some embodiments, units or other functional elements) of the computing environment 100. In some embodiments, the computing device 510 and/or a first subset of the computing device(s) 570 can embody or can constitute the service unit(s) 110. In addition or in other embodiments, the computing device 510 and/or a second subset of the computing device(s) 570 can embody or can constitute the storage configuration unit(s) 130. Further or in yet other embodiments, the computing device 510 and/or a third subset of the computing device(s) 570 can embody or can constitute the repository 120.

The computational environment 500 represents an example implementation of the various aspects or features of the disclosure in which the processing or execution of operations described in connection with the searching of logging information disclosed herein can be performed in response to execution of one or more software components at the computing device 510. It should be appreciated that the one or more software components can render the computing device 510, or any other computing device that contains such components, a particular machine for searching logging information, in accordance with aspects described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as one or more of the example methods illustrated in FIGS. 2-4. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 510 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 510 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with the searching of logging information described herein can comprise personal computers; server computers; laptop devices; handheld computing devices, such as mobile tablets; wearable computing devices; and multiprocessor systems. Additional examples can include programmable consumer electronics, network personal computers (PCs), minicomputers, mainframe computers, blade computers, programmable logic controllers, distributed computing environments that comprise any of the above systems or devices, and the like.

As illustrated, the computing device 510 can comprise one or more processors 514, one or more input/output (I/O) interfaces 516, a memory 530, and a bus architecture 532 (also termed bus 532) that functionally couples various functional elements of the computing device 510. In certain embodiments, the computing device 510 can include, optionally, a radio unit 512. The radio unit 512 can include one or more antennas and a communication processing unit that can permit wireless communication between the computing device 510 and another device, such as one of the computing device(s) 570. The bus 532 can include at least one of a system bus, a memory bus, an address bus, or a message bus, and can permit exchange of information (data, metadata, and/or signaling) between the processor(s) 514, the I/O interface(s) 516, and/or the memory 530, or respective functional elements therein. In certain scenarios, the bus 532 in conjunction with one or more internal programming interfaces 550 (also referred to as interface(s) 550) can permit such exchange of information. In scenarios in which processor(s) 514 include multiple processors, the computing device 510 can utilize parallel computing.

The I/O interface(s) 516 can permit communication of information between the computing device and an external device, such as another computing device, e.g., a network element or an end-user device. Such communication can include direct communication or indirect communication, such as exchange of information between the computing device 510 and the external device via a network or elements thereof. As illustrated, the I/O interface(s) 516 can comprise one or more of network adapter(s) 518, peripheral adapter(s) 522, and rendering unit(s) 526. Such adapter(s) can permit or facilitate connectivity between the external device and one or more of the processor(s) 514 or the memory 530. For example, the peripheral adapter(s) 522 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 518 can functionally couple the computing device 510 to one or more computing devices 570 via one or more traffic and signaling links 560 that can permit or facilitate exchange of traffic 562 and signaling 564 between the computing device 510 and the one or more computing devices 570. Such network coupling provided at least in part by the at least one of the network adapter(s) 518 can be implemented in a wired environment, a wireless environment, or both. The information that is communicated by the at least one of the network adapter(s) 518 can result from the implementation of one or more operations of a method in accordance with aspects of this disclosure. Such output can be any form of visual representation, including, but not limited to, textual, graphical, animation, audio, tactile, and the like. In certain scenarios, each (or, in some embodiments, at least one) of the computing device(s) 570 can have the same architecture as (or, in some embodiments, a similar architecture to) the computing device 510. In addition or in the alternative, the rendering unit(s) 526 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 510, or can permit conveying or revealing the operational conditions of the computing device 510.

In one aspect, the bus 532 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like. The bus 532, and all buses described herein can be implemented over a wired or wireless network connection and each of the subsystems, including the processor(s) 514, the memory 530 and memory elements therein, and the I/O interface(s) 516 can be contained within one or more remote computing devices 570 at physically separate locations, connected through buses of this form, in effect implementing a fully distributed system. In certain embodiments, such a distributed system can implement the functionality described herein in a client-host or client-server configuration in which the database update component(s) 536 or the database update information 540, or both, can be distributed between the computing device 510 and at least one of the computing device(s) 570, and the computing device 510 and at least one of the computing device(s) 570 can execute such components and/or leverage such information in order to provide or otherwise facilitate the functionalities described herein in connection with the searching of logging information. In such embodiments, for example, a combination of the computing device 510 and at least one of the computing device(s) 570 can embody or can constitute respective devices (or, in some implementations, components or other functional elements) of the computing environment 100. As such, in some example implementations, a computing device of the computing device(s) 570 can embody or can include a semi-connected device as described herein.

The computing device 510 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 510, and can comprise, for example, both volatile and non-volatile media, and removable and/or non-removable media. In one aspect, the memory 530 can comprise computer-readable media in the form of volatile memory, such as random access memory (RAM), and/or non-volatile memory, such as read-only memory (ROM).

The memory 530 can comprise functionality instructions storage 534 and functionality information storage 538. The functionality instructions storage 534 can comprise computer-accessible instructions that, in response to execution (by at least one of the processor(s) 514), can implement one or more of the functionalities of the disclosure. The computer-accessible instructions can embody or can comprise one or more software components illustrated as database update component(s) 536. In one scenario, execution of at least one component of the database update component(s) 536 can implement one or more of the methods described herein, such as one or more of the example methods described in connection with FIGS. 2-4. For instance, such execution can direct or otherwise cause a processor (e.g., one of the processor(s) 514) that executes the at least one component to carry out a disclosed example method. It should be appreciated that, in one aspect, a processor of the processor(s) 514 that executes at least one of the database update component(s) 536 can retrieve information from or retain information in one or more memory elements 540 in the functionality information storage 538 in order to operate in accordance with the functionality programmed or otherwise configured by the database update component(s) 536. In some embodiments, one or more of the database update component(s) 536 can embody or can constitute at least a portion of a transaction library in accordance with aspects described herein. The one or more memory elements 540 may be referred to as database update information 540. Such information can include at least one of code instructions, information structures, or the like. For instance, in some embodiments, at least a portion of such information structures can be indicative or otherwise representative of records; hash keys; range keys; pointers; edge state information; a combination thereof; or the like.

At least a first one of the one or more interfaces 550 (e.g., application programming interface(s)) can permit or facilitate communication of information between two or more components within the functionality instructions storage 534. The information that is communicated by the at least one interface can result from implementation of one or more operations in a method of the disclosure. In certain embodiments, one or more of the functionality instructions storage 534 and the functionality information storage 538 can be embodied in or can comprise removable/non-removable, and/or volatile/non-volatile computer storage media.

At least a portion of at least one of the database update component(s) 536 or the database update information 540 can program or otherwise configure one or more of the processors 514 to operate at least in accordance with the functionality described herein. One or more of the processor(s) 514 can execute at least one of the database update component(s) 536 and leverage at least a portion of the information in the functionality information storage 538 in order to provide or otherwise facilitate the searching of logging information in accordance with one or more aspects described herein.

It should be appreciated that, in certain scenarios, the functionality instruction(s) storage 534 can embody or can comprise a computer-readable non-transitory storage medium having computer-accessible instructions that, in response to execution, cause at least one processor (e.g., one or more of the processor(s) 514) to perform a group of operations comprising the operations or blocks described in connection with the disclosed methods.

In addition, the memory 530 can comprise computer-accessible instructions and information (e.g., data, metadata, and/or programming code instructions) that permit or facilitate the operation and/or administration (e.g., upgrades, software installation, any other configuration, or the like) of the computing device 510. Accordingly, as illustrated, the memory 530 can comprise a memory element 542 (labeled operating system (OS) instruction(s) 542) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 510 can dictate a suitable OS. The memory 530 also comprises a system information storage 546 having data, metadata, and/or programming code that permits or facilitates the operation and/or administration of the computing device 510. Elements of the OS instruction(s) 542 and the system information storage 546 can be accessible or can be operated on by at least one of the processor(s) 514.

It should be recognized that while the functionality instructions storage 534 and other executable program components, such as the OS instruction(s) 542, are illustrated herein as discrete blocks, such software components can reside at various times in different memory components of the computing device 510, and can be executed by at least one of the processor(s) 514. In certain scenarios, an implementation of the database update component(s) 536 can be retained on or transmitted across some form of computer-readable media.

The computing device 510 and/or one of the computing device(s) 570 can include a power supply (not shown), which can power up components or functional elements within such devices. The power supply can be a rechargeable power supply, e.g., a rechargeable battery, and it can include one or more transformers to achieve a power level suitable for the operation of the computing device 510 and/or one of the computing device(s) 570, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 518) to connect operationally to the conventional power grid. In another aspect, the power supply can include an energy conversion component, such as a solar panel, to provide additional or alternative power resources or autonomy for the computing device 510 and/or one of the computing device(s) 570.

The computing device 510 can operate in a networked environment by utilizing connections to one or more remote computing devices 570. As an illustration, a remote computing device can be a personal computer, a portable computer, a server, a router, a network computer, a peer device or other common network node, and so on. As described herein, connections (physical and/or logical) between the computing device 510 and a computing device of the one or more remote computing devices 570 can be made via one or more traffic and signaling links 560, which can comprise wired link(s) and/or wireless link(s) and several network elements (such as routers or switches, concentrators, servers, and the like) that form a PAN, a LAN, a MAN, a WAN, and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote computing devices (computing device(s) 570) that are functionally coupled (e.g., communicatively linked or otherwise coupled) through a network having traffic and signaling links and related network elements. In a distributed computing environment, in one aspect, one or more software components (such as program modules) can be located in both a local computing device 510 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," "engine," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module," "engine" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for accessing and/or configuring information retained in a graph store built or otherwise based on a distributed hash table. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:

receiving a function call to perform an update to a pair of records in a distributed hash table;

reading, by a computing system comprising one or more host computers, from a state table, a current state and a current version of an edge associated with a start node in the distributed hash table and an end node in the distributed hash table;

updating, by the computing system, the current state in the state table to indicate that a transition from the current state to another state is in progress, resulting in an updated state;

determining, by the computing system, that a first record associated with the start node has a record state corresponding to the updated state;

updating, by the computing system, the first record to indicate a change in progress between the start node and an end node;

determining, by the computing system, that a second record associated with the end node has a record state corresponding to the updated current state;

updating, by the computing system, the second record to indicate that a change is in progress between the end node and the start node;
updating, by the computing system, the state table to indicate that the update is committed;
determining by the computing system, that a change value is associated with the start node;
updating, by the computing system, the start node to remove the change value;
updating, by the computing system, the start node to configure a new state of the start node;
determining, by the computing system, that the change value is associated with the end node;
updating, by the computing system, the end node to remove the change value;
updating, by the computing system, the end node to configure a new state of the end node;
determining, by the computing system, that the update is in a committed state;
updating, by the computing system, first information in the state table to indicate that the current version is a new current version; and
updating, by the computing system, second information in the state table to indicate that the current state is a new current state.

2. The method of claim 1, further comprising removing, by the computing system, references to the function call to perform the update to the pair of records in the distributed hash table.

3. The method of claim 1, further comprising querying the distributed hash table to obtain one or more records associated with a hash key of a node, the querying including reading one or more edges respectively associated with the one or more records.

4. The method of claim 3, further comprising determining that a value of an edge of the one or more edges is indicative of a change in progress;
reading a current state of the node from the state table; and
for the current state indicative of a change-in-progress state or a failed state, configuring a value of a record associated with the edge to an extant value, or
for the current state indicative of a committed state, configuring the value of the record associated with the edge to a new value.

5. The method of claim 1, further comprising reading, by the computing system,
a second current state and a second current version from a state table;
determining, by the computing system, that state information is unavailable;
reading, by the computing system, a first record for a node;
determining, by the computing system, using the first record that multiple records are included in the node;
reading, by the computing system, a last record for the node using a pointer to the last record, the last record storing data for the node;
determining, by the computing system, that a size to store the data is greater than a maximum size;
incrementing, by the computing system, the pointer in the record to match the size; and
generating, by the computing system, a state record indicative of a location to store the data and an update being made.

6. A system, comprising:
at least one memory device having computer-executable instructions; and
at least one processor coupled to the at least one memory device and configured, by the computer-executable instructions, to:
receive a function call to perform a change to a pair of records in a graph store;
determine, from a state table, a current state and a current version of an edge associated with a start node in the graph store and an end node in the graph store;
update the current state in the state table to indicate that a transition from the current state to a changed state is intended;
determine that a first record associated with the start node has a record state corresponding to the updated state;
update the first record to indicate a change in progress between the start node and an end node;
determine that a second record associated with the end node has a record state corresponding to the updated state;
update the second record to indicate that a change is in progress between the end node and the start node;
update the state table to indicate that the change is committed;
update first information in the state table to indicate that the current version is a new current version; and
update second information in the state table to indicate that the current state is a new current state.

7. The system of claim 6, wherein the at least one processor is further configured, by the computer-executable instructions, to:
determine that the change is in a committed state.

8. The system of claim 6, wherein the at least one processor is further configured, by the computer-executable instructions, to:
determine that a change value is associated with the start node;
update the start node to remove the change value; and
update the start node to configure a new state of the start node.

9. The system of claim 8, wherein the at least one processor is further configured, by the computer-executable instructions, to:
determine that the change value is associated with the end node;
update the end node to remove the change value; and
update the end node to configure a new state of the end node.

10. The system of claim 6, wherein the at least one processor is further configured, by the computer-executable instructions, to add a log record to log information, the log record indicative of the change being complete.

11. The system of claim 6, wherein the at least one processor is further configured, by the computer-executable instructions, to query the graph store to obtain one or more records associated with a hash key of a node, the querying including accessing one or more edges respectively associated with the one or more records.

12. The system of claim 11, wherein the at least one processor is further configured, by the computer-executable instructions, to:
determine that a value of an edge of the one or more edges is indicative of a change in progress;
access a current state of the node from the state table; and
for the current state indicative of a change-in-progress state or a failed state, configure a value of a record associated with the edge to an extant value, or for the current state indicative of a committed state, configure the value of the record associated with the edge to a new value.

13. The system of claim 6, wherein the at least one processor is further configured, by the computer-executable instructions, to:

access a second current state and a second current version from a state table;

determine that state information is unavailable;

access a first record for a node; and determine, using the first record, that multiple records are included in the node.

14. The system of claim 13, wherein the at least one processor is further configured, by the computer-executable instructions, to:

access a last record for the node using a pointer to the last record, the last record storing data for the node;

determine that a size to store the data is greater than a threshold size;

increment the pointer in the record to match the size; and generate a state record indicative of a location to store the data and an update being made.

15. A method, comprising:

receiving a function call to perform an update to a pair of records in a graph store;

determining, by a computing system comprising one or more host computers, from a state table, a current state and a current version of an edge associated with a start node in the graph store and an end node in the graph store;

updating, by the computing system, the current state in the state table to indicate that a transition from the current state to an updated state is intended;

determining, by the computing system, that a first record associated with the start node has a record state corresponding to the updated state;

updating, by the computing system, the first record to indicate a change in progress between the start node and an end node;

determining, by the computing system, that a second record associated with the end node has a record state corresponding to the updated state;

updating, by the computing system, the second record to indicate that a change is in progress between the end node and the start node; and updating, by the computing system, the state table to indicate that the update is committed;

determining, by the computing system, that a change value is associated with the start node;

updating, by the computing system, the start node to remove the change value; and updating, by the computing system, the start node to configure a new state of the start node.

16. The method of claim 15, further comprising determining, by the computing system, that the update is in a committed state;

updating, by the computing system, first information in the state table to indicate that the current version is a new current version; and updating, by the computing system, second information in the state table to indicate that the current state is a new current state.

17. The method of claim 15, further comprising determining, by the computing system, that the change value is associated with the end node;

updating, by the computing system, the end node to remove the change value; and updating, by the computing system, the end node to configure a new state of the end node.

18. The method of claim 15, further comprising adding, by the computing system, a log record to log information, the log record indicative of the update being complete.

19. The method of claim 15, further comprising removing, by the computing system, references to the function call to perform the update to the pair of records in a distributed hash table.

20. The method of claim 15, further comprising determining, by the computing system, that the update is in a committed state.

* * * * *